US 7,999,402 B2

(12) United States Patent
Freeland et al.

(10) Patent No.: US 7,999,402 B2
(45) Date of Patent: Aug. 16, 2011

(54) ELECTROMECHANICAL GENERATOR FOR CONVERTING MECHANICAL VIBRATIONAL ENERGY INTO ELECTRICAL ENERGY

(75) Inventors: Roy Freeland, Shawford (GB); Stephen Roberts, Winchester (GB)

(73) Assignee: Perpetuum Ltd., Epsilon House, Chilworth Science Park Southampton (GB)

( * ) Notice: Subject to any disclaimer, the term of this patent is extended or adjusted under 35 U.S.C. 154(b) by 521 days.

(21) Appl. No.: 12/088,626

(22) PCT Filed: Oct. 3, 2006

(86) PCT No.: PCT/GB2006/003685
§ 371 (c)(1),
(2), (4) Date: Jul. 14, 2008

(87) PCT Pub. No.: WO2007/039733
PCT Pub. Date: Apr. 12, 2007

(65) Prior Publication Data
US 2009/0218824 A1 Sep. 3, 2009

(30) Foreign Application Priority Data
Oct. 4, 2005 (GB) .................................. 0520184.3

(51) Int. Cl.
*F02B 63/04* (2006.01)
(52) U.S. Cl. ........................................ 290/1 R; 310/339
(58) Field of Classification Search .................. 290/1 R; 180/165, 166, 65.31; 310/319, 339; 47/59 R
See application file for complete search history.

(56) References Cited

U.S. PATENT DOCUMENTS

| 3,581,130 | A | | 5/1971 | Grib |
|---|---|---|---|---|
| 3,984,707 | A | | 10/1976 | McClintock |
| 4,610,546 | A | * | 9/1986 | Intraub .......................... 366/110 |
| 7,231,874 | B2 | * | 6/2007 | Rastegar et al. .............. 102/207 |
| 7,304,398 | B1 | * | 12/2007 | Kim et al. ..................... 290/1 E |
| 7,342,347 | B2 | * | 3/2008 | Magnussen et al. ..... 310/323.01 |
| 7,453,163 | B2 | * | 11/2008 | Roberts et al. ................ 290/1 R |
| 7,530,760 | B2 | * | 5/2009 | Rastegar et al. .............. 404/10 |
| 7,554,224 | B2 | * | 6/2009 | Roberts .......................... 310/15 |
| 7,557,456 | B2 | * | 7/2009 | Kornbluh et al. .............. 290/42 |
| 7,589,427 | B2 | * | 9/2009 | Davis ............................ 290/1 R |
| 7,795,763 | B2 | * | 9/2010 | Harris et al. ............... 310/12.16 |
| 2003/0034652 | A1 | * | 2/2003 | Slatkin .......................... 290/1 R |
| 2005/0082912 | A1 | | 4/2005 | Junger et al. |
| 2007/0007770 | A1 | | 1/2007 | Jager et al. |
| 2010/0033142 | A1 | * | 2/2010 | Roberts et al. .................. 322/40 |

FOREIGN PATENT DOCUMENTS

| DE | 10055846 A1 | 5/2002 |
|---|---|---|
| DE | 10301192 A1 | 7/2004 |
| GB | 2425160 A | 10/2006 |
| GB | 2425222 A | 10/2006 |
| WO | 0101546 A2 | 1/2001 |
| WO | 2005022726 A1 | 3/2005 |
| WO | 2005093931 A1 | 10/2005 |

* cited by examiner

*Primary Examiner* — Michael C Zarroli
(74) *Attorney, Agent, or Firm* — Colin P. Cahoon; Carstens & Cahoon, LLP

(57) ABSTRACT

An electromechanical generator comprising a resonator comprising a vibratable mass, a biasing device connected to the vibratable mass, a power transduction device for converting mechanical vibrational movement of the vibratable mass into electrical power, and a resonator support for supporting the vibratable mass, biasing device and power transduction device, the electromechanical generator further comprising a vibratable mount incorporating at least one spring, the vibratable mount being connected to the resonator support for mounting the resonator to a vibratable body from which electrical energy is to be harvested.

16 Claims, 3 Drawing Sheets

ELECTROMECHANICAL GENERATOR FOR CONVERTING MECHANICAL VIBRATIONAL ENERGY INTO ELECTRICAL ENERGY

BACKGROUND OF THE INVENTION

The present invention relates to an electromechanical generator for converting mechanical vibrational energy into electrical energy. The present invention also relates to a method of converting mechanical vibrational energy into electrical energy using an electromechanical generator In particular, the present invention relates to such a device which is a miniature generator capable of converting ambient vibration energy into electrical energy for use, for example, in powering intelligent sensor systems. Such a system can be used in inaccessible areas where wires cannot be practically attached to provide power or transmit sensor data.

There is currently an increasing level of research activity in the area of alternative power sources for micro electrical mechanical systems (MEMS) devices, such devices being described in the art as being used for 'energy harvesting' and as 'parasitic power sources'. Such power sources are currently being investigated for powering wireless sensors.

DESCRIPTION OF THE PRIOR ART

It is known to use an electromagnetic generator for harvesting useful electrical power from ambient vibrations. A typical magnet-coil generator consists of a spring-mass combination attached to a magnet or coil in such a manner that when the system vibrates, a coil cuts through the flux formed by a magnetic core. The mass which is moved when vibrated is spring mounted, for example on a cantilever beam. The beam can either be connected to the magnetic core, with the coil fixed relative to an enclosure for the device, or vice versa.

For example, WO-A-2005/022726 discloses various types of electromechanical generator, in particular fabricated using deposited layers.

A simple mass-spring resonator energy harvesting generator has a well-known frequency response for its total dissipated power, P:

$$P = \frac{1/2\omega^6 c}{\left(\frac{k}{m}-\omega^2\right)^2 + \left(\frac{c\omega}{m}\right)^2} Y_0^2 \quad (1)$$

Where $\omega$ and $Y_0$ are the angular frequency and amplitude of the (single-frequency) ambient vibration, c is the damping coefficient which represents both loss and power transduction mechanisms and m and k are the effective mass and spring constant of the resonator respectively. FIG. 1 shows the power dissipated by damping for a typical set of parameters. It is clear from this figure that (in the absence of a frequency tuning mechanism) the frequency of the ambient vibration must be known in advance of the design of the energy harvester in order for maximum power to be extracted from the ambient via the damping.

There is a need to improve the design of known electromechanical generators to enhance the efficiency of electrical power generation from mechanical vibrations, particularly to accommodate variations in, or lack of accurate prior knowledge of, the ambient vibration frequency.

SUMMARY OF THE INVENTION

The present invention aims to provide to an improved electromechanical generator for converting mechanical vibrational energy into electrical energy.

It is a particular aim of the present invention to allow a greater power output from an electromechanical generator, used as an energy harvester, with less accurate prior knowledge of the ambient vibration frequency.

The present invention accordingly provides an electromechanical generator comprising a resonator comprising a vibratable mass, a biasing device connected to the vibratable mass, a power transduction device for converting mechanical vibrational movement of the vibratable mass into electrical power, and a resonator support for supporting the a vibratable mass, biasing device and power transduction device, the electromechanical generator further comprising a vibratable mount incorporating at least one spring, the vibratable mount being connected to the resonator support for mounting the resonator to a vibratable body from which energy is to be harvested.

Preferably, the at least one spring comprises a cantilever beam.

More preferably, the vibratable mount further comprises a rigid fixture for mounting the cantilever beam to a vibratable body in spaced relation thereto to permit the cantilever beam to oscillate when vibrated.

More preferably, the resonator and the rigid fixture are affixed to opposed ends of the cantilever beam.

Preferably, the vibratable body and the resonator mounted thereon have a resonant frequency selected so that the amplitude of vibration of the resonator at a given ambient frequency when mounted on the vibratable mount which is in turn mounted to a vibratable body as a source of vibration is greater than the amplitude of vibration of the resonator at the same ambient frequency when mounted directly to a vibratable body as the source of vibration.

Preferably, the resonator and the vibratable mount are adapted to vibrate at different resonant frequencies.

The electromagnetic generator may further comprise a mass which is mounted to the vibratable mount in order to change the resonant frequency of the vibratable mount.

The present invention also provides a method of converting mechanical vibrational energy into electrical energy using an electromechanical generator, the method comprising the steps of: providing an electromechanical generator comprising a resonator comprising a vibratable mass, a biasing device connected to the vibratable mass, a power transduction device for converting mechanical vibrational movement of the vibratable mass into electrical power, and a resonator support for supporting the vibratable mass, biasing device and power transduction device, the electromechanical generator further comprising a vibratable mount incorporating at least one spring, the vibratable mount being connected to the resonator support; mounting the vibratable mount to a vibratable body from which electrical energy is to be harvested; vibrating the vibratable body thereby to vibrate the vibratable mount and the resonator; and taking output electrical power from the power transduction device.

Preferably, the at least one spring comprises a cantilever beam.

More preferably, the vibratable mount further comprises a rigid fixture for mounting the cantilever beam to the vibratable body so that in the mounting step the cantilever beam is mounted the vibratable body in spaced relation thereto to permit the cantilever beam to oscillate when vibrated.

More preferably, the resonator and the rigid fixture are affixed to opposed ends of the cantilever beam.

Preferably, the vibratable body and the resonator mounted thereon have a resonant frequency selected so that the amplitude of vibration of the resonator at a given ambient frequency when mounted on the vibratable mount which is in turn mounted to a vibratable body as a source of vibration is greater than the amplitude of vibration of the resonator at the same ambient frequency when mounted directly to a vibratable body as the source of vibration.

Preferably, the resonator and the vibratable mount adapted to vibrate at different resonant frequencies.

The method may further comprise mounting a mass to the vibratable mount in order to change the resonant frequency of the vibratable mount.

Preferably, in the vibrating step the vibratable body is vibrated at a given angular frequency ω and the resonant frequency of the vibratable body and the resonator mounted thereon is selected so as to be within +/−1% of the angular frequency ω.

Preferably, the mass of the resonator and the spring constant of the at least one spring are selected so that the lowest ambient frequency of vibration of the vibratable body in the vibrating step is between the angular frequency $$\omega_{unity} = \frac{\omega_{res}^2}{\sqrt{2\omega_{res}^2 - \left(\frac{c}{m}\right)^2}}$$

and the angular frequency $\omega_{res} = \sqrt{(k/m)}$
where m is the effective mass of the resonator, k is the spring constant of the at least one spring, and c is a damping factor of the power transduction device.

BRIEF DESCRIPTION OF THE DRAWINGS

Embodiments of the present invention will now be described by way of example only with reference to the accompanying drawings, in which.

DETAILED DESCRIPTION OF THE PREFERRED EMBODIMENTS

Figure 1:
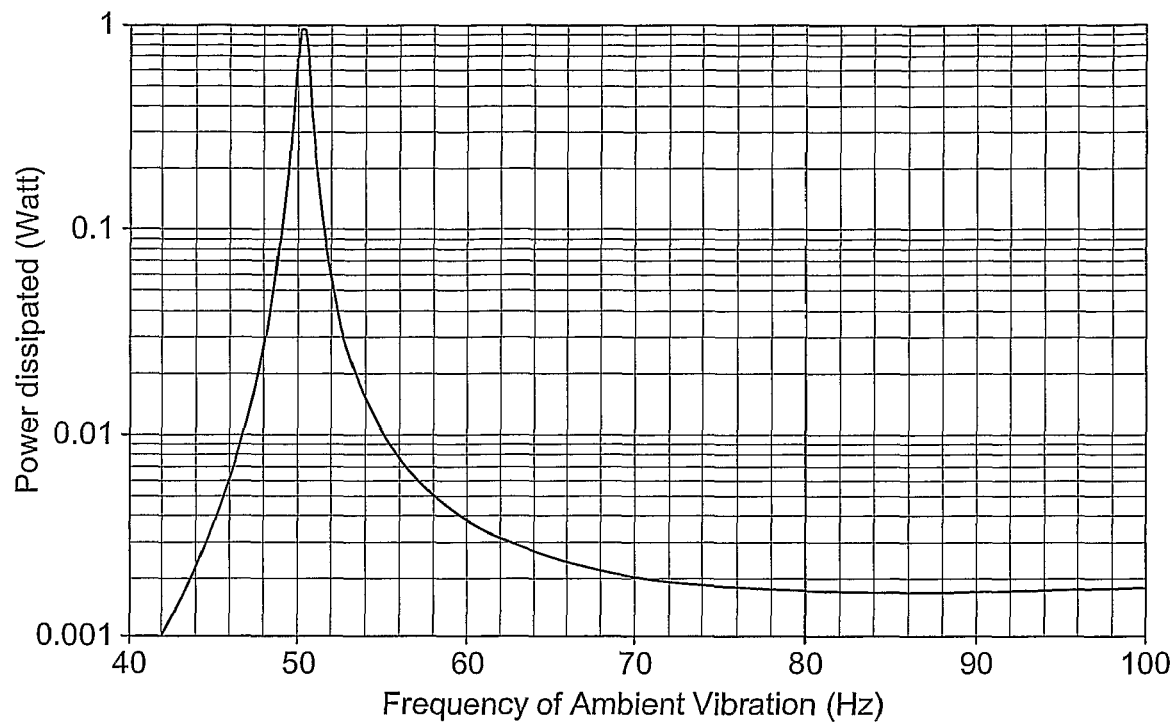
FIG. 1 is a graph showing the relationship between power dissipated and frequency of ambient vibration for a known electromechanical generator.
Figure 2:
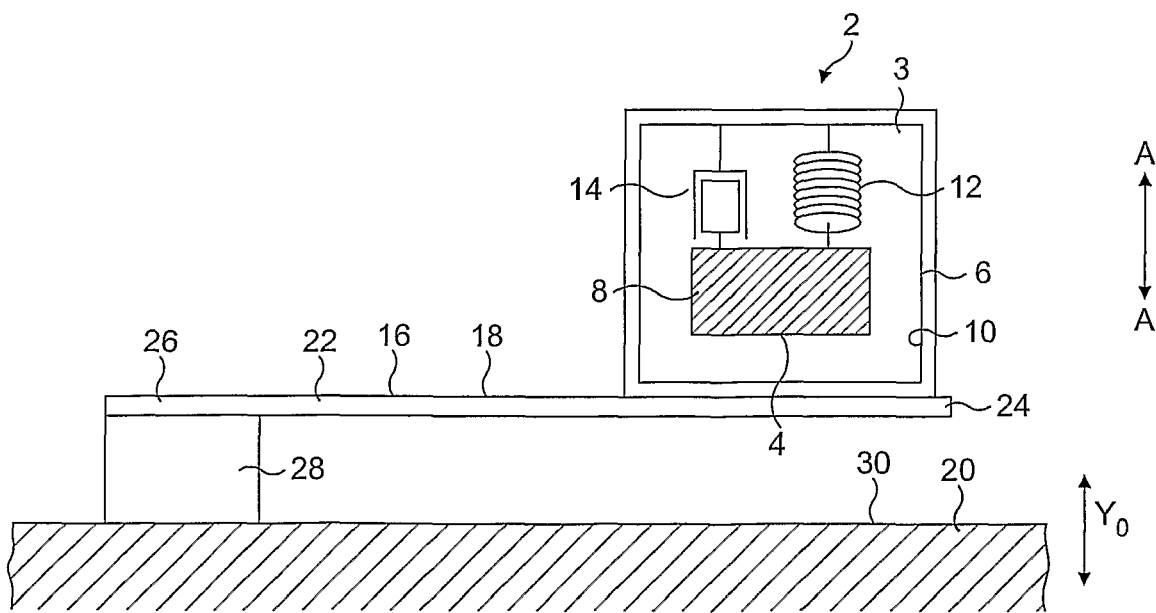
FIG. 2 is a schematic side elevation of an electromechanical generator in accordance with a first embodiment of the present invention mounted on a vibratable body.

FIG. 2 shows an electromechanical generator 2 for converting mechanical vibrational energy into electrical energy in accordance with a first embodiment of the present invention. The electromechanical generator 2 includes a resonator 3 comprising a resonant mass-spring arrangement 4 mounted within an enclosure 6. The resonant mass-spring arrangement 4 comprises a vibratable inertial mass 8 mounted to an internal wall 10 of the enclosure 6 by a biasing device comprising a spring 12 and a power transduction device comprising a damper 14, the spring 12 and damper 14 being in a parallel configuration. The enclosure 6 constitutes a support for the elements of the resonator, namely the vibratable inertial mass 8, the biasing device 12 and the power transduction device 14. Other resonator structures known to those skilled in the art may be employed in accordance with the present invention.

If the enclosure 6 is subject to a source of external vibration that causes it to move along the direction A-A, then the inertial mass 8 may move relative to the enclosure 6, also along the direction A-A. In doing so, the length of the spring 12 is changed, either being compressed or extended, and work is done against the damper 14.

In FIG. 2, for simplicity the damper 14 is shown schematically as a piston and cylinder arrangement. However, as known to persons skilled in the art, the damper 14 comprises an assembly capable of generating an electrical current when the two parts thereof are subjected to relative movement. The mechanical power may be converted to electrical power via an electromagnetic coupling or via a piezoelectric coupling. Typically, the "piston" which as arranged to be translationally movable comprises an electrical coil and the "cylinder" which is arranged to be static comprises a magnetic assembly that generates a region of magnetic flux within which the electrical coil is disposed. However, an opposite configuration may be employed. Movement of the electrical coil within the magnetic flux causes an electrical current to be induced in the electrical coil which can be used as a source of electrical power for driving an external device (not shown).

The present invention typically utilizes electromechanical devices which are resonant generators known in the art as "velocity-damped" where all of the work done by the movement of the inertial mass 8 relative to the enclosure 6 is proportional to the instantaneous velocity of that movement. Inevitably, a portion of that work is absorbed overcoming unwanted mechanical or electrical losses, but the remainder of the work may be used to generate an electrical current via a suitable transduction mechanism, such as the electrical coil/magnetic assembly described above.

The electromechanical generator 2 further comprises a vibratable mount 16 incorporating at least one spring 18. The vibratable mount 16 is connected to the enclosure 6, constituting the resonator support, and is arranged or adapted to mount the resonator 3 to a vibratable body 20 from which energy is to be harvested. In this embodiment the at least one spring 18 comprises a flexible cantilever beam 22 composed, for example, of spring steel, at one end 24 of which the resonator 3 is affixed and at the other end 26 of which a rigid mounting fixture 28 is affixed. The rigid mounting fixture 28 is typically a block and acts as a spacer to space the cantilever beam 22 from the surface of the body 20 so as to permit the cantilever beam 22 to vibrate in an oscillatory manner relative thereto.

FIG. 2 shows the electromechanical generator 2 in accordance with the first embodiment of the present invention used as an energy harvesting device. The electromechanical generator 2 is mounted on a substrate 30 comprising a surface of the vibratable body 20 from which energy is to be harvested. In use, the substrate 30 moves vertically in an oscillatory motion with amplitude $Y_0$.

The mounting fixture 28 of the electromechanical generator 2 is clamped to the substrate 30 so that the cantilever beam 22 can freely oscillate over a desired amplitude. The oscillation of substrate 30 results in an oscillation of the resonator 3 on the cantilever beam 22 that is governed (ignoring the effect of the sprung mass within the cantilever beam 22) by the effective mass, m, of the resonator 3 and the spring constant, k, of the cantilever beam 22 via the following expression:

$$A = \frac{\omega^2}{\sqrt{\left(\frac{k}{m} - \omega^2\right)^2 + \left(\frac{c\omega}{m}\right)^2}} \quad (2)$$

Where ω is the frequency of the ambient vibration, c is the factor resulting from damping and A is the ratio of the amplitudes of the resonator 3 and of the substrate 30—otherwise referred to as the amplification factor.

However, the amplifying effect of mounting the resonator 3 on cantilever beam 22 is only useful if the resonant frequency of the resonator 3 on cantilever beam 22 is near to the ambient frequency of vibration of the body 20. It is to be noted that the amplification factor is always greater than unity for ambient vibrations with frequency higher than $$\omega_{unity} = \frac{\omega_{res}^2}{\sqrt{2\omega_{res}^2 - \left(\frac{c}{m}\right)^2}} \quad (3)$$

Where $\omega_{res} = \sqrt{(k/m)}$ and represents the resonant frequency of the resonator 3/cantilever beam 22 resonator system.

In practice the mass of resonator 3 and the spring constant of cantilever beam 22 would be chosen such that the lowest expected ambient frequency was between the frequency given in equation (3) and the resonant frequency, $\omega_{res}$. This would provide that the amplification factor was always greater than unity.

The calculation resulting in equation (2) above is a first-order approximation that assumes that the sprung effective mass within the resonator 3 is significantly less than the entire mass of the resonator 3. In practice this may not be the case with all electromechanical generators that type, in which case the amplification factor calculated by equation (2) would not accurately predict the actual amplification factor for such a construction.

Figure 3:
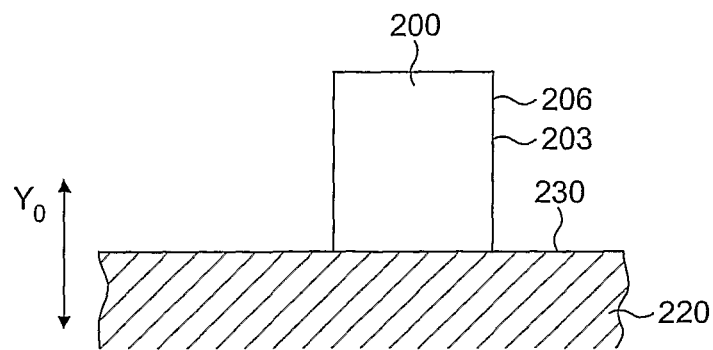
FIG. 3 is a schematic side elevation of a known electromechanical mounted on a vibratable body.

In contrast, FIG. 3 shows a known electromechanical generator 200 used as an energy harvesting device. The electromechanical generator 200 is correspondingly mounted on a substrate 230 comprising a surface of a vibratable body 220 from which energy is to be harvested. In use, the substrate 230 similarly moves vertically in an oscillatory motion with amplitude $Y_0$. In accordance with the known construction, as shown in FIG. 3 the known electromechanical generator 200 is mounted to the substrate 230, for example by clamping, by mounting the resonator 203, for example the resonator support 206 comprising an enclosure for the elements of the resonator 203, directly to the substrate 230.

From equation (2) above for the amplification factor it may be seen that for a range of ambient frequencies above and below the resonant frequency set by the effective mass of the resonator 3 and the spring constant of cantilever beam 22, the vertical amplitude of the resonator 3 is greater than that of the resonator 203 of the known device which is directly mounted to the substrate 230. This in effect results in greater driving amplitude for the internal sprung mass within the resonator 3 of the electromechanical generator 2 of the present invention as compared to the known electromechanical generator 202. This correspondingly results in a greater generated output power from the electromechanical generator 2 of the present invention as compared to the known electromechanical generator 202. It should be noted that this increased power output is achieved irrespective of the resonant frequency of the resonant mass-spring system 4 actually within the resonator 3, because a greater driving amplitude would always produce a greater oscillation.

Figure 4:
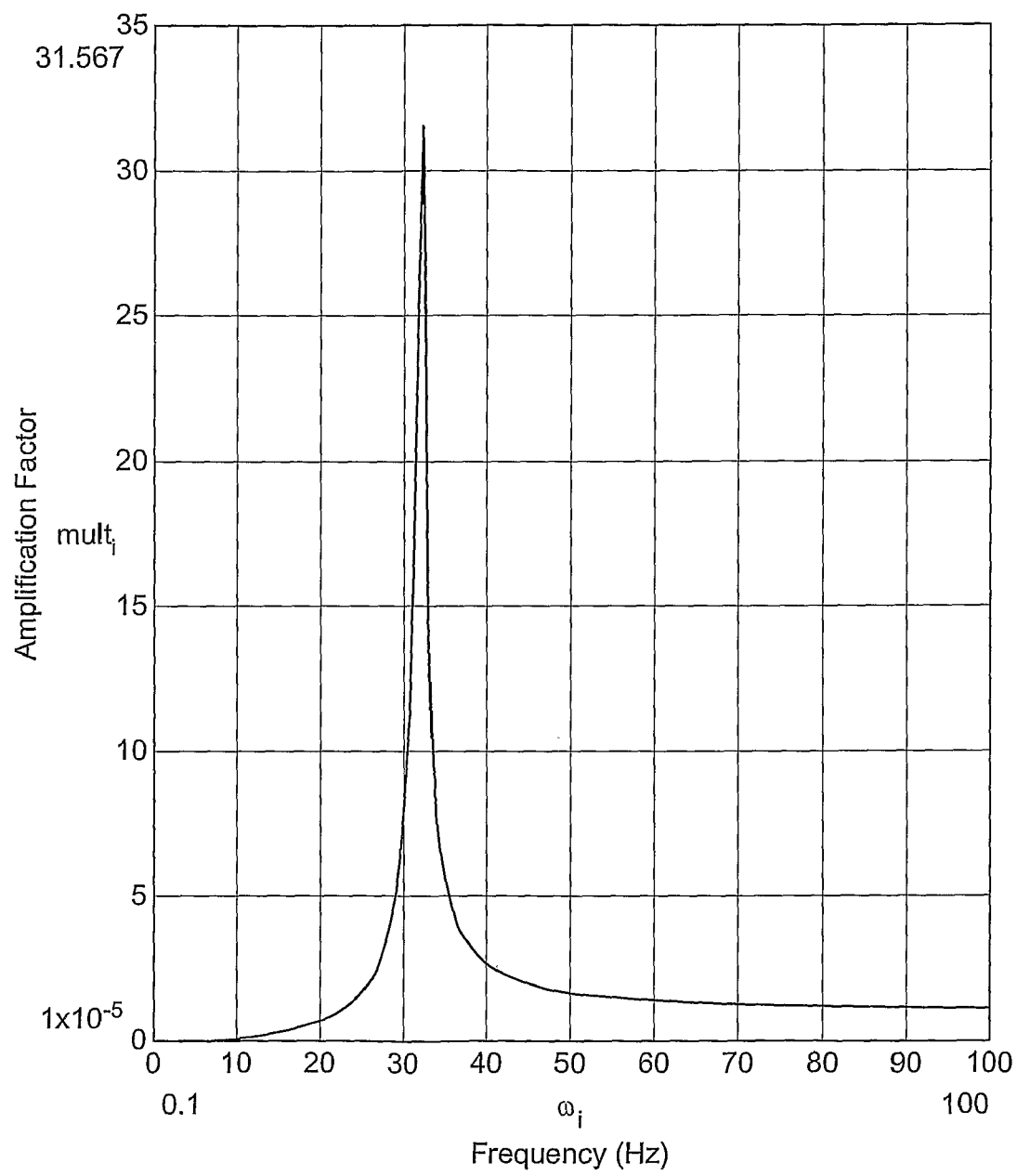
FIG. 4 is a graph showing the relationship between the amplification factor and frequency an electromechanical generator in accordance with an example of the first embodiment of the present invention.

As an example, the amplification factor (calculated using equation (2) above) for an embodiment of the electromechanical generator 2 of the present invention where the mass of the resonator 3 is m=100 gm, the spring constant of cantilever beam 22, k=100 Nm$^{-1}$, the damping factor of the damper 14, c=0.1 Nsm$^{-1}$ is shown in FIG. 4.

Figure 5:
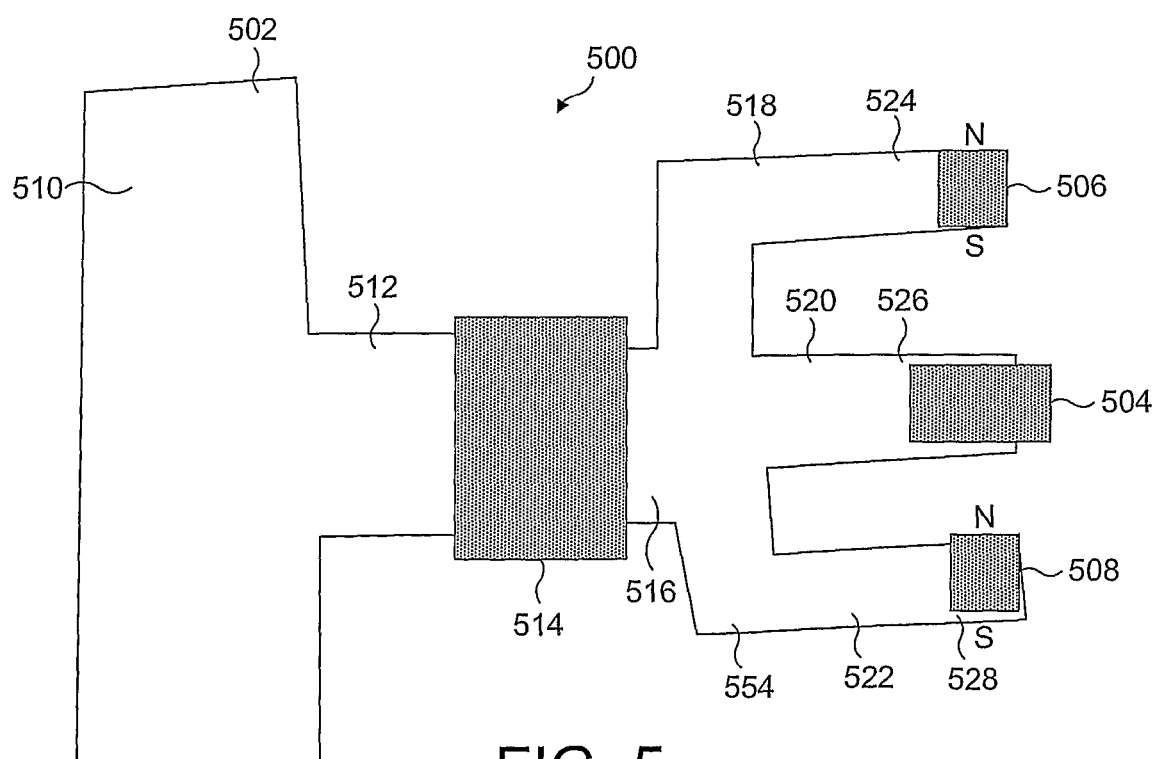
FIG. 5 is a schematic plan view of an electromechanical generator in accordance with a second embodiment of the present invention.

A further embodiment of an electromagnetic generator in accordance with the present invention is shown in FIG. 5. In this embodiment, the electromagnetic generator 500 comprises a vibratable mount 502 for a resonator 504. The vibratable mount 502 comprises a primary cantilever beam 512 that connects a mass 514, on one side of mass 514, to a primary base 510 which is arranged or adapted to be attached to a vibratable body (not shown). The mass 514 is also connected, on an opposite side thereof, to the resonator 554 that comprises a secondary base 516 that supports three secondary cantilever beams 518, 520, 522, substantially parallel to each other and coplanar. The centre beam 520 has a mass which is substantially the same as that of the two outer beams 518, 522 combined, which have equal mass. In other words, the mass of each outer beam 518, 522 is substantially one half of the mass of the centre beam 520. At the free ends 524, 528 of two of the secondary beams 518, 522, which are outermost of the three secondary beams, is mounted a respective magnet 506 and 508 and at the free end 526 of a central secondary beam 520 is mounted a coil 504. The mass 514 and the spring constant of primary beam 512 are chosen such that the resonant frequency of the secondary base 516 is similar to that of the vibration source (i.e. the body to which the primary base 510 is mounted in use). As discussed above, this results in a greater amplitude of vibration of the secondary base 516 than would be produced if the secondary base 516 were connected directly to the vibration source. Hence a greater amplitude of vibration is also produced in magnets 506 and 508 and in coil 504 than would be produced if secondary base 516 were connected directly to the vibration source. This leads to a higher power output from the system when the vibration source is of similar frequency to the resonant frequency of the secondary base 516, rather than the resonant frequencies of coil 504 and magnets 506 and 508 on their respective secondary cantilever beams 520, 518, 522.

The magnets may optionally be produced by depositing, for example by printing, magnetic material onto the respective beams rather than by attaching preformed magnets to the beams. This is particularly applicable to miniaturised devices, and can lower the production cost by using known batch fabrication processes to form layers on a substrate which is to form the integral base and beams. The integral base and beams may be composed of a metal or metal alloy, or a semiconductor such as silicon. The coil 504 is characterised by the proportion of the coil that passes through the magnetic field, the number of turns in the coil, and its series resistance. Second-order effects such as coil inductance can often be ignored due to the low frequency of many applications. Two types of coil may be used in the present invention: wound coils, and printed coils.

For efficient energy conversion, in the second embodiment of the invention the beams carrying the magnets and the coils(s) are excited at a resonant frequency. This resonant frequency is sensitive to beam amplitude and environmental temperature. It is also desired to determine the maximum beam amplitude that should be allowed to prevent damage through over straining the beam material. Preferably, the design includes a vacuum-sealed housing (not shown) so that a vacuum surrounds the entire device.

The electromechanical generator is mounted on the host device so as to achieve a most preferred mode of vibration, which is that the three beams 518, 520, 522 vibrate out of the plane of the resonating structure (i.e. out of the plane of the drawing of FIG. 5). The beams 518, 520, 522 vibrate therefore in a manner similar to the tines of a triple beam double ended tuning fork. Most preferably, the vibration of the beams 518, 520, 522 is in a preferred resonant mode so that the vibration of the coil 504 on the centre beam 520 is in anti-phase to that of each of the two magnets 506, 508 mounted on the outer beams 518, 522 (i.e. the phase difference between the coil 504 and the magnets 506, 508 is 180°). This antiphase vibrational relationship between the coil 504 on the one hand and the magnets 506, 508 (and thus the magnetic flux) on the other hand thereby allows maximum relative displacement of the coil 504 and the magnets 506, 508 and thus maximum cutting of the magnetic flux by the movement of the coil 504 relative to the magnets 506, 508.

In alternative embodiments which are modifications of the embodiment of FIG. 5, the coil and/or the magnets may be mounted at other points on the beams, other than at the beam ends, and additionally or alternatively the magnets may be mounted on the centre beam and coils may be mounted on the two outer beams. In a further modification, links or stiffening members may be additionally incorporated on or between the beams carrying the magnets in order to stiffen those beams, thereby to oppose the mutually attracted force of the two magnets and stop the beams from being distorted or damaged.

In the preferred mode of resonance the vibration of the coil 504 is in anti-phase to that of the magnets 506, 508 allowing maximum relative displacement and maximum flux cutting to take place. This embodiment of the present invention provides a means of moving the coil 504 in anti-phase with the magnets 506, 508 so as to provide a greater relative velocity between the magnets 506, 508 and the coil 504.

Although the illustrated embodiments employ a cantilever as the spring for mounting the resonator to the body, in other embodiments of the present inventions other alternative spring arrangements may provide a suitable spring constant, for example a helical spring.

The electromechanical generator of the present invention has particular application in the provision of electrical power to sensor systems. In accordance with the invention, typical application areas for such self powered intelligent sensor systems are: inside or on the body (e.g. human, animal); on rotating objects; within liquids such as molten plastic or setting concrete; structural monitoring such as within bridges, buildings, aircraft or roads; and environmental monitoring, such as pollution monitoring in fields.

The invention claimed is:

1. An electromechanical generator comprising a resonator comprising a vibratable mass, a biasing device connected to the vibratable mass, a power transduction device for converting mechanical vibrational movement of the vibratable mass into electrical power, and a resonator support for supporting the vibratable mass, biasing device and power transduction device, the electromechanical generator further comprising a vibratable mount incorporating at least one spring, the vibratable mount being connected to the resonator support for mounting the resonator to a vibratable body from which electrical energy is to be harvested.

2. An electromechanical generator according to claim 1 wherein the at least one spring comprises a cantilever beam.

3. An electromechanical generator according to claim 2 wherein the vibratable mount further comprises a rigid fixture for mounting the cantilever beam to a vibratable body in spaced relation thereto to permit the cantilever beam to oscillate when vibrated.

4. An electromechanical generator according to claim 3 wherein the resonator and the rigid fixture are affixed to opposed ends of the cantilever beam.

5. An electromechanical generator according to claim 1 wherein the vibratable body and the resonator mounted thereon have a resonant frequency selected so that the amplitude of vibration of the resonator at a given ambient frequency when mounted on the vibratable mount which is in turn mounted to a vibratable body as a source of vibration is greater than the amplitude of vibration of the resonator at the same ambient frequency when mounted directly to a vibratable body as the source of vibration.

6. An electromechanical generator according to claim 1 wherein the resonator and the vibratable mount are adapted to vibrate at different resonant frequencies.

7. An electromagnetic generator according to claim 1 further comprising a second mass which is mounted to the vibratable mount in order to change the resonant frequency of the vibratable mount.

8. A method of converting mechanical vibrational energy into electrical energy using an electromechanical generator, the method comprising the steps of:

providing an electromechanical generator comprising a resonator comprising a vibratable mass, a biasing device connected to the vibratable mass, a power transduction device for converting mechanical vibrational movement of the vibratable mass into electrical power, and a resonator support for supporting the vibratable mass, biasing device and power transduction device, the electromechanical generator further comprising a vibratable mount incorporating at least one spring, the vibratable mount being connected to the resonator support;

mounting the vibratable mount to a vibratable body from which electrical energy is to be harvested;

vibrating the vibratable body thereby to vibrate the vibratable mount and the resonator; and taking output electrical power from the power transduction device.

9. A method according to claim 8 wherein the at least one spring comprises a cantilever beam.

10. A method according to claim 9 wherein the vibratable mount further comprises a rigid fixture for mounting the cantilever beam to the vibratable body so that in the mounting step the cantilever beam is mounted the vibratable body in spaced relation thereto to permit the cantilever beam to oscillate when vibrated.

11. A method according to claim 10 wherein the resonator and the rigid fixture are affixed to opposed ends of the cantilever beam.

12. A method according to claim 8 wherein the vibratable body and the resonator mounted thereon have a resonant frequency selected so that the amplitude of vibration of the resonator at a given ambient frequency when mounted on the vibratable mount which is in turn mounted to a vibratable body as a source of vibration is greater than the amplitude of vibration of the resonator at the same ambient frequency when mounted directly to a vibratable body as the source of vibration.

13. A method according to claim 8 wherein the resonator and the vibratable mount are adapted to vibrate at different resonant frequencies.

14. A method according to claim 8 further comprising mounting a second mass to the vibratable mount in order to change the resonant frequency of the vibratable mount.

15. A method according to claim 8 wherein in the vibrating step the vibratable body is vibrated at a given angular frequency ω and the resonant frequency of the vibratable body and the resonator mounted thereon is selected so as to be within +/−1% of the angular frequency ω.

16. A method according to claim 8 wherein the mass of the resonator and the spring constant of the at least one spring are selected so that the lowest ambient frequency of vibration of the vibratable body in the vibrating step is between the frequency $$\omega_{unity} = \frac{\omega_{res}^2}{\sqrt{2\omega_{res}^2 - \left(\frac{c}{m}\right)^2}}$$

and the frequency $\omega_{res} = \sqrt{(k/m)}$
where m is the effective mass of the resonator, k is the spring constant of the at least one spring, and c is a damping factor of the power transduction device.

\* \* \* \* \*